US012249775B2

(12) United States Patent
Tipul

(10) Patent No.: US 12,249,775 B2
(45) Date of Patent: Mar. 11, 2025

(54) ULTRA-WIDE BAND ANTENNA AND RELATED SYSTEM

(71) Applicants: 2J ANTENNAS USA, CORPORATION, Gilbert, AZ (US); 2J ANTENNAS S.R.O., Bardejov (SK)

(72) Inventor: Peter Tipul, Lukavica (SK)

(73) Assignee: 2J ANTENNAS USA, CORPORATION, Gilbert, AZ (US)

( * ) Notice: Subject to any disclaimer, the term of this patent is extended or adjusted under 35 U.S.C. 154(b) by 0 days.

(21) Appl. No.: 17/772,992

(22) PCT Filed: Jan. 10, 2022

(86) PCT No.: PCT/US2022/011762
§ 371 (c)(1),
(2) Date: Apr. 28, 2022

(87) PCT Pub. No.: WO2023/132837
PCT Pub. Date: Jul. 13, 2023

(65) Prior Publication Data

US 2024/0356227 A1 Oct. 24, 2024

(51) Int. Cl.
*H01Q 9/04* (2006.01)
*H01Q 21/30* (2006.01)

(52) U.S. Cl.
CPC ........... *H01Q 9/0414* (2013.01); *H01Q 21/30* (2013.01)

(58) Field of Classification Search
CPC ............................. H01Q 9/0414; H01Q 21/30
See application file for complete search history.

(56) References Cited

U.S. PATENT DOCUMENTS

2005/0270243 A1 12/2005 Caimi et al.
2006/0214850 A1 9/2006 O'Riordan et al.
2011/0018780 A1 * 1/2011 Tassoudji ............... H01Q 21/28 343/893
2018/0115080 A1 4/2018 Hussain et al.
2019/0027829 A1 * 1/2019 Tomlin ................... H01Q 9/045
2022/0006168 A1 1/2022 Taguchi et al.

FOREIGN PATENT DOCUMENTS

CN 110518355 A 11/2019

* cited by examiner

*Primary Examiner* — Dieu Hien T Duong
(74) *Attorney, Agent, or Firm* — CP LAW GROUP PC; Cy Bates

(57) ABSTRACT

An ultra-wide band antenna is disclosed. The antenna generally includes a substrate having a top surface and a bottom surface. A first radiator having a positive polarization is disposed at the top surface, and a second radiator and a third radiator, each having a negative polarization, are disposed at the bottom surface. The first, second, and third radiators each have a minor portion and a major portion which are parallel with respect to each other. Size of each radiator in descending order from largest to smallest radiator is the second radiator, the first radiator, and the third radiator.

20 Claims, 5 Drawing Sheets

ULTRA-WIDE BAND ANTENNA AND RELATED SYSTEM

TECHNICAL FIELD

This invention relates to antennas; more particularly, surface mount antennas for operation in 4GLTE and 5GNR.

BACKGROUND ART

Previously, antenna designs have predominantly been focused on topologies in the higher frequencies. However, lower frequencies at the 600 and 700 MHz bands that were previously used by old analog television are now part of cellular applications due to increase market demands. Antennas now need to cover bands in both the high and low frequencies.

SUMMARY OF INVENTION

Technical Problem

Bandwidths for cellular applications have widened with the inclusion of lower bands like 617-960 MHz. A single antenna radiator that efficiently covers the entire bandwidth is not realistic given the different requirements optimal antennas possess for lower frequencies compared to higher frequencies. Additional challenges are present when designing antenna topologies that cover a wide spectrum of 617-960 MHz, 1427-2690 MHz, 3300-5000 MHz, and 5150-7125 MHz to operate 4GLTE and 5GNR around the world.

New antenna topologies are needed to efficiently cover both high frequencies and low frequencies while maintaining a small form factor, which is desirable in the electronic industry to simplify manufacturing, especially in high volume applications.

Solution to Problem

Disclosed is an antenna that comprises a substrate having a top surface and a bottom surface. A first radiator having a positive polarization is disposed at the top surface, and a second radiator and a third radiator, each having a negative polarization, are disposed at the bottom surface. The first, second, and third radiators each have a minor portion and a major portion which are parallel with respect to each other. Size of each radiator in descending order from largest to smallest radiator is the second radiator, the first radiator, and the third radiator.

Advantageous Effects of Invention

An antenna comprising a large, medium, and small resonators described herein is capable of efficiently cover both high and low frequencies while maintaining a small form factor.

The large, medium, and small resonators having alternating polarizations of negative, positive, negative, respectively maximizes conservation of energy.

The two negative resonators each being disposed on the substrate at the bottom surface lowers the resonance necessary to cover the newly added 600 MHz frequencies. A serpentine termination additionally helps to improve resonance at lower frequencies.

Mounting pads make adhesion of the antenna to a circuit strong and secure.

A single antenna which has a small form factor and can cover a wide frequency band is highly desirable in the electronic industry. It lowers costs, simplifies manufacturing processes, and allows products to be smaller overall.

Other features and benefits will be appreciated by one having skill in the art upon a thorough review of the instant disclosure.

BRIEF DESCRIPTION OF THE DRAWINGS

Other features, combinations, and embodiments will be appreciated by one having the ordinary level of skill in the art of antennas and accessories upon a thorough review of the following details and descriptions, particularly when reviewed in conjunction with the drawings, wherein.

DETAILED DESCRIPTION

Figure 1:
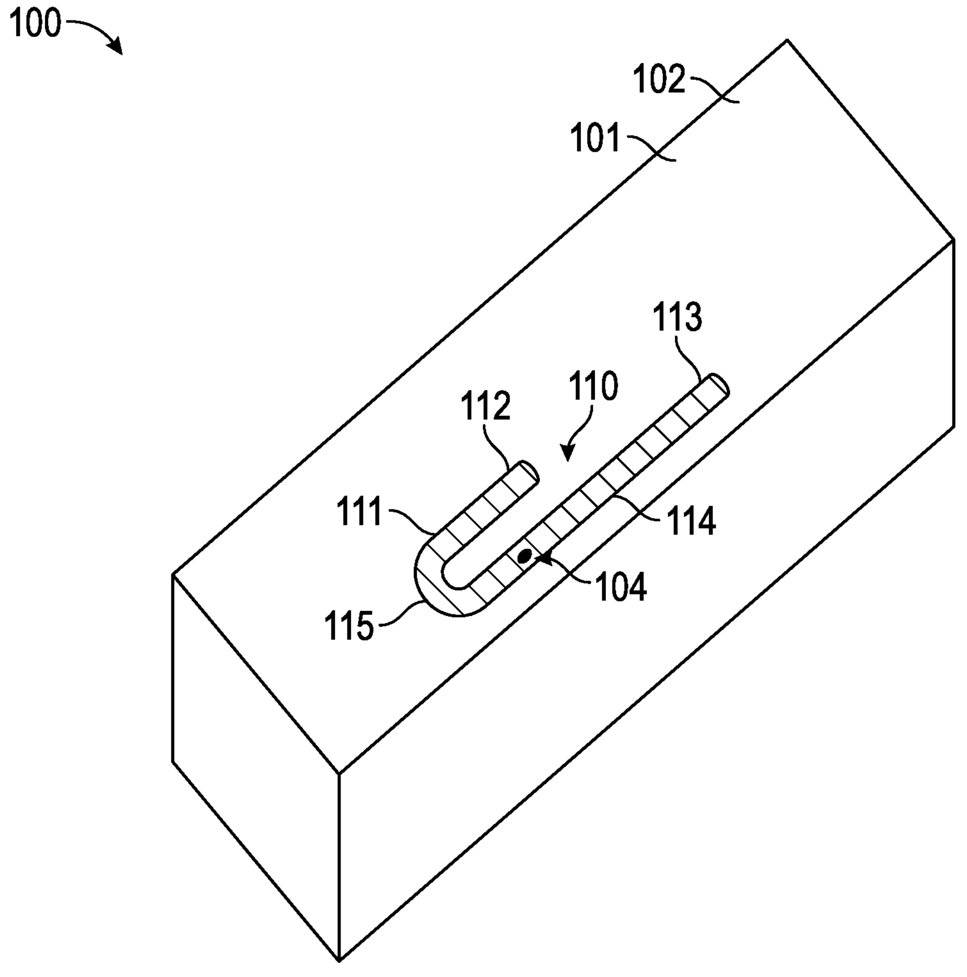
FIG. 1 shows a top perspective view of an antenna in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "MIMO" means Multiple Input Multiple Output.

The term "substrate" means a flat or nearly flat surface that contains a conducting portion and can be used a holder of surface mount antennas.

The term "perimeter" means one or more portions that defines an outer region of a geometric shape.

The term "radiator" means a conducting element of an antenna that is electrically connected to a radio receiver and/or a radio transmitter and which transmits and/or receives radio waves.

The term "embedded antenna" means a metallic conductor embedded in a dielectric material.

The term "mirrored" means an object that is identical in form to another, but with the structure reversed.

Unless explicitly defined herein, terms are to be construed in accordance with the plain and ordinary meaning as would be appreciated by one having skill in the art.

General Description of Embodiments

In one general embodiment, an ultra-wide band antenna is disclosed. The antenna comprises a substrate having a top surface and a bottom surface opposite the top surface, a first resonator disposed on the top surface, a second resonator disposed on the bottom surface, and a third resonator disposed on the bottom surface. The first resonator comprises a first major portion, a first minor portion in parallel alignment with the first major portion, and a first connecting portion coupled to each of the first major portion and the first minor portion. The first resonator comprises a positive polarization. The second resonator comprises a second major portion having a second major length, a second minor portion having a second minor length, the second minor portion being in parallel alignment with the second major portion, and a second connecting portion coupled to each of the second major portion and the second minor portion. The second resonator comprises a negative polarization. The third resonator comprises a third major portion having a third major length, a third minor portion having a third minor length, the third minor portion being in parallel alignment with the third major portion, and a third connecting portion coupled to each of the third major portion and the third minor portion. The third resonator comprises a negative polarization. Additionally, the second minor portion comprises the third major portion.

In some embodiments, the second major portion may further comprise a meandering portion coupled to a terminal end thereof.

Generally, the second major length is greater than second minor length, and the third major length is greater than third minor length. Generally, the second major length is greater than the first major length, and the third major length is less than the first major length.

In some embodiments, the second minor length is greater than the first minor length, and the third minor length is less than the first minor length.

In some embodiments, the second major portion may comprise a thickness less than the second minor portion.

In some embodiments, the antenna may further comprise a negative mount pad disposed on the second minor portion. In some embodiments, the antenna may further comprise a via extending between the top and bottom surfaces, and a positive mounting pad coupled to the via on the bottom surface.

In some embodiments, the antenna comprises a monopole-PFA structure.

In a second general embodiment, an ultra-wide band antenna is disclosed. The antenna comprises a substrate having a top surface and a bottom surface opposite the top surface, a first resonator disposed on the top surface, a second resonator disposed on the bottom surface, and a third resonator disposed on the bottom surface. The first resonator comprises a first major portion, a first minor portion, and a first connecting portion coupled to each of the first major portion and the first minor portion. The second resonator comprises a second major portion having a second major length, a second minor portion having a second minor length, and a second connecting portion coupled to each of the second major portion and the second minor portion. The third resonator comprises a third major portion having a third major length, a third minor portion having a third minor length, and a third connecting portion coupled to each of the third major portion and the third minor portion. Additionally, the first radiator is in positive polarization and the second and third radiators are each in negative polarization.

Generally, the first major and minor portions are in parallel alignment, the second major and minor portions are in parallel alignment, and the third major and minor portions are in parallel alignment.

In some embodiments, the second minor portion comprises the third major portion.

In some embodiments, the second major portion may further comprise a meandering portion coupled to a terminal end thereof.

Generally, the second major length is greater than second minor length, and the third major length is greater than third minor length. In some embodiments, the second major length is greater than the first major length, and the third major length is less than the first major length.

Generally, the second minor length is greater than the first minor length, and the third minor length is less than the first minor length.

In some embodiments, the second minor portion may comprise a thickness less than the second major portion.

In some embodiments, the antenna comprises a monopole-PFA structure.

In a third general embodiment, a MIMO antenna system is disclosed. The system comprises a system substrate comprising a perimeter and a center portion. The perimeter comprises a clearance zone and the center portion comprises a ground plane. The system further comprises a plurality of embedded antennas disposed along the perimeter, wherein each of the plurality of embedded antennas comprises a substrate having a top surface and a bottom surface opposite the top surface, a first resonator disposed on the top surface, a second resonator disposed on the bottom surface, and a third resonator disposed on the bottom surface. The first resonator comprises a first major portion, a first minor portion, and a first connecting portion coupled to each of the first major portion and the first minor portion, wherein the first resonator comprises a positive polarization. The second resonator comprises a second major portion having a second major length, a second minor portion having a second minor length, and a second connecting portion coupled to each of the second major portion and the second minor portion, wherein the second resonator comprises a negative polarization. The third resonator comprises a third major portion having a third major length, a third minor portion having a third minor length, and a third connecting portion coupled to each of the third major portion and the third minor portion, wherein the third resonator comprises a negative polarization.

Generally, the first major and minor portions are in parallel alignment, the second major and minor portions are in parallel alignment, and the third major and minor portions are in parallel alignment.

In some embodiments, the second minor portion comprises the third major portion.

In some embodiments, the second major portion may further comprise a meandering portion coupled to a terminal end thereof.

Generally, the second major length is greater than second minor length, and the third major length is greater than third minor length. In some embodiments, the second major length is greater than the first major length, and the third major length is less than the first major length.

Generally, the second minor length is greater than the first minor length, and the third minor length is less than the first minor length.

In some embodiments, the second minor portion may comprise a thickness less than the second major portion.

In some embodiments, each antenna comprises a monopole-PFA structure.

Manufacturing

Generally, the substrate is made of industry standard material such as ceramic, plastic polymer, or low-cost fiberglass. Examples may include FR4, Kapton or Pyralux with printed circuit design affixed thereto. Otherwise, the substrate can be fabricated in accordance with the level and knowledge of one having skill in the art.

The antenna radiators may be fabricated by etching the antenna element pattern in a metal trace bonded to an insulating dielectric substrate, such as a printed circuit board.

Each of the components of the antenna and related system described herein may be manufactured and/or assembled in accordance with the conventional knowledge and level of a person having skill in the art.

While various details, features, combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

Illustrated Description of Embodiments

FIG. 1 shows a top perspective view of an antenna (100) in accordance with a first illustrated embodiment. The antenna comprises a substrate (101) having a top surface (102) and a bottom surface (not shown) opposite the top surface. Disposed on the top surface is a first resonator (110). The first resonator comprises a first major portion (113) having a first major length (114) and a first minor portion (111) having a first minor length (112). The first major portion and the first minor portion are electrically coupled together by a first connecting portion (115). The connecting portion can be curved as shown, or alternatively angled or linear in shape. The first radiator is in positive polarization and is configured to operate efficiently with relatively mid frequencies.

Disposed on the first radiator (110) is a via (104) which extends from the top surface (102) through the substrate (101) to the bottom surface. The via is shown located on the first major portion (113). In alternative embodiments, the via may be disposed on the first minor portion (111), the first connecting portion (115), or elsewhere on the top surface which is electrically coupled to the first radiator.

The first major portion (113) and the first minor portion (111) are shown each comprising linear, elongated portions of the first radiator (110). The first major and minor portions are in a parallel alignment with each other. As shown, the first major length (114) is greater than the first minor length (112). In alternative embodiments the first minor length can be equal to or greater than the first major length. Thickness of the first major and minor portions are illustrated as being generally equal in size. In alternative embodiment, thicknesses of the first major and minor portions can differ such that the first major portion comprises a greater thickness or a smaller thickness.

Figure 2:
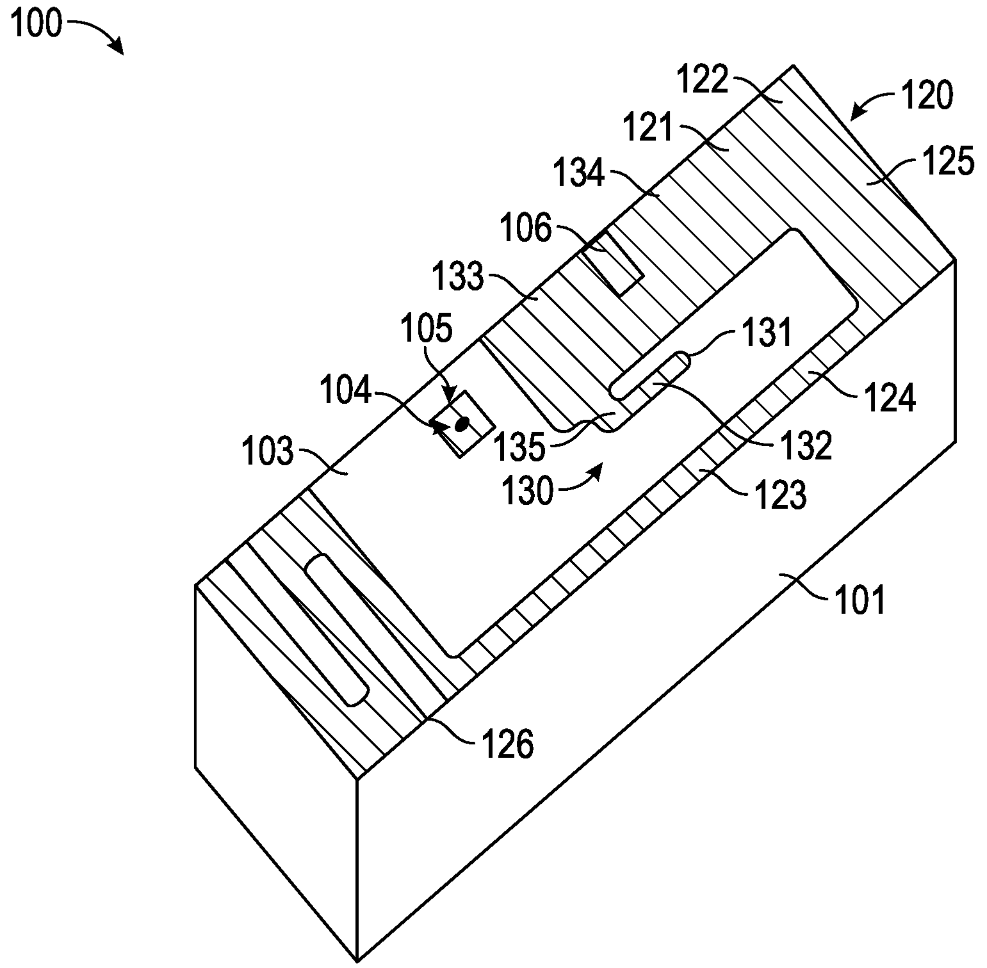
FIG. 2 shows a bottom perspective view of the antenna according to the first illustrated embodiment.

FIG. 2 shows a bottom perspective view of a bottom surface (103) of the antenna (100) according to the first illustrated embodiment. Disposed on the bottom surface of a substrate (101) is a second radiator (120) and a third radiator (130). The second radiator comprises a second minor portion (121) parallel to a second major portion (123). A second connecting portion (125) is coupled to both the second major and minor portions. Generally, the second major portion comprises a second major length (124) and the second minor portion comprises a second minor length (122) such that the second major length is greater than the second minor length.

The third radiator (130) comprises a third minor portion (131) having a third minor length (132) and a third major portion (133) having a third major length (134). Preferably, the second minor portion (121) comprises the third major portion such that the third major portion and the second minor portion are one of the same. The third minor portion is coupled to the third major portion, and additionally the second minor portion, by a third connecting portion (135). Like the first radiator (FIG. 1, 110) and the second radiator (120), the major and minor portions of the third radiator are in a parallel formation with respect to each other.

Both the second resonator (120) and the third radiator (130) are in negative polarization which assists with covering particular frequency bands like the 600 MHz band. The antenna comprises three radiators, namely the first radiator (FIG. 1, 110), the second radiator, and the third radiator. The second radiator can be characterized as the largest of the three radiators and the third radiator can be characterized as the smallest of the three resonators. The polarization of the first, second, and third radiators can be described as alternating (negative, positive, negative) based on descending size (second radiator, first radiator, third radiator) which maximizes conservation of energy. The second radiator is configured to operate efficiently with lower frequencies whereas the third radiator is configured to operate efficiently with higher frequencies.

The second radiator (120) further comprises an optional meandering portion (126) coupled to a terminal end of the second major portion (123). More specifically, the meandering portion is coupled to the second major portion at an opposite end to where the second major portion couples with the second connecting portion (125). The meandering portion is configured to improve resonance at lower frequencies. As shown, the meandering portion comprises three parallel portions coupled together to form an angled S-shape. Other shapes of the meandering portion, including additional portions beyond three may also be utilized by one having skill in the art for improving resonance at lower frequencies.

The bottom surface (103) further comprises a via (104) which extends from the bottom surface to the top surface (FIG. 1, 102). The via is electrically coupled to a positive terminal pad (105) on the bottom surface. Signals passing through the positive terminal pad are configured to travel through the substrate (101) to the first radiator (FIG. 1, 110) disposed on the top surface, or alternatively the positive terminal pad is configured to receive signals from the first radiator. In some embodiments, the positive terminal pad is configured to couple to a port of a cellular module. A negative terminal pad (106) is disposed on the second radiator (120) and is configured to couple to a ground of an electronic circuit board where the antenna (100) is being affixed therewith.

Figure 3:
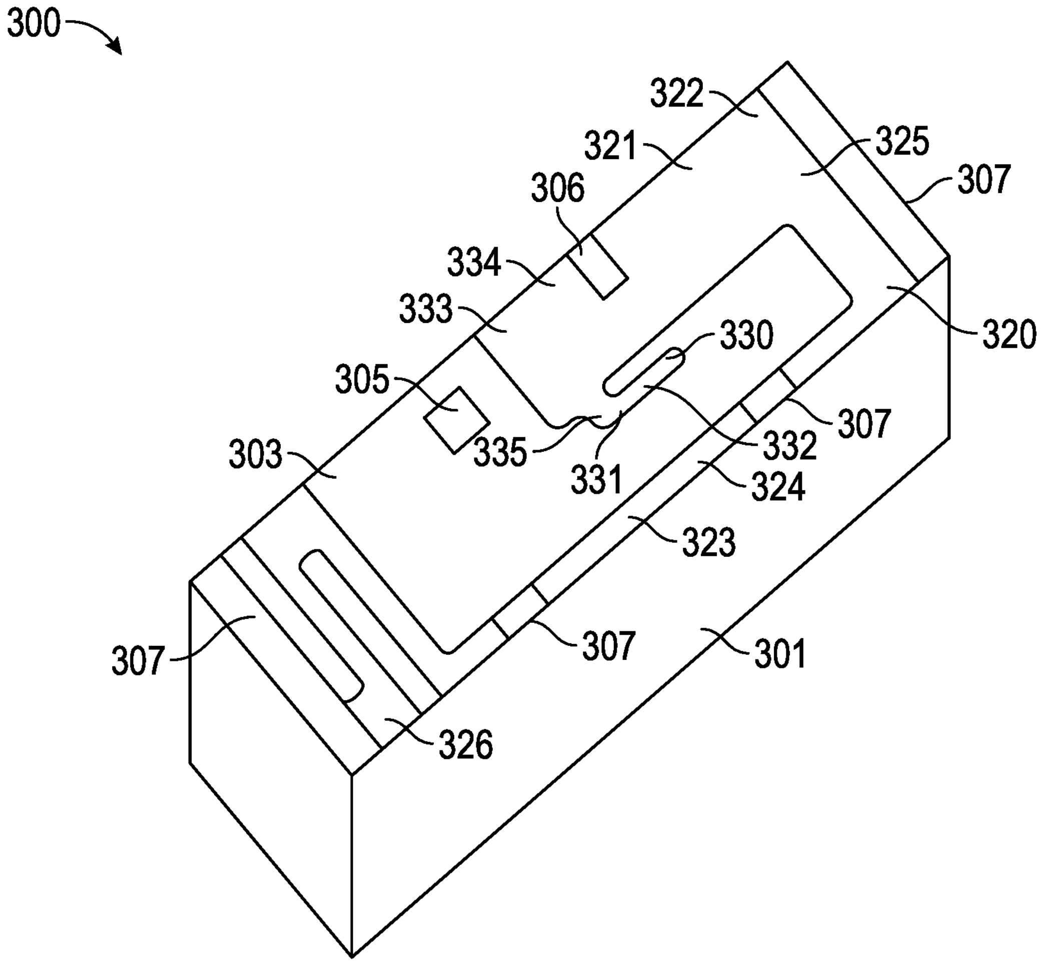
FIG. 3 shows a bottom perspective view of the antenna in accordance with a second illustrated embodiment.

FIG. 3 shows a bottom perspective view of the antenna (300) in accordance with a second illustrated embodiment. The antenna comprises a substrate (301) having a bottom surface (303) and a top surface (not shown), opposite the bottom surface. The bottom surface comprises a second radiator (320) and a third radiator (330). The second radiator comprises a second connecting portion (325) coupled to both a second major portion (323) and a second minor portion (321). The third radiator comprises a third minor portion (331) coupled to the second minor portion by a third connecting portion (335) such that the second minor portion is also a third major portion (333) for the third radiator. A negative terminal pad (306) is electrically coupled to the second and third radiators, and a positive terminal pad (305) is electrically coupled to a first radiator (not shown) disposed on the top surface.

The second minor portion (321) comprises a second minor length (322) and the second major portion (323) comprises a second major length (324) wherein the second major length is greater than the second minor length. Additionally, the third minor portion (331) comprises a third minor length (332) and the third major portion (333) comprises a third major length (334) wherein the third major length is greater than the third minor length.

In an exemplary embodiment, the second major length (324) is longer to both the third major length (334) and a first major length (FIG. 1, 114). Additionally, the third major length may be shorter to both the first major length and second major length.

In an exemplary embodiment, the second minor length (322) is longer to both the third minor length (332) and a first minor length (FIG. 1, 112). Additionally, the third minor length may be shorter to both the first minor length and the second minor length.

As shown, the second major portion (323) comprises a thickness which is less than a thickness associated with the second minor portion (321). In other embodiments, a thickness associated with the second minor portion may be equal to or greater than a thickness of the second major portion. To maximize space, the second connecting portion (325) comprises a linear shape such that corners formed by the second connecting portion and the second major and minor portions are right angles which conform to corners of the substrate (301). The second minor portion is disposed on one end of the substrate and the second major portion is disposed on an opposite end. A meandering portion (326) is coupled to the second major portion wherein the meandering portion is disposed on the substrate opposite the second connecting portion.

The antenna (300) further comprises mounting pads (307) disposed on the bottom surface (303) for the purpose of strongly securing the antenna to an electronic circuit board. The mounting pads are compatible with surface mount technology known to one having skill in the art. As shown, the mounting pads are disposed on the second connecting portion (325), the meandering portion (326), and the second major portion (323). Other configurations can similarly be implemented for securely coupling the bottom surface to an electronic circuit board.

Between the second minor portion (321) and the meandering portion (326) is unoccupied surface which is free from negatively polarized resonators. Preferably, the first radiator (FIG. 1, 110) overlaps with a substantial portion of the unoccupied surface.

Figure 4:
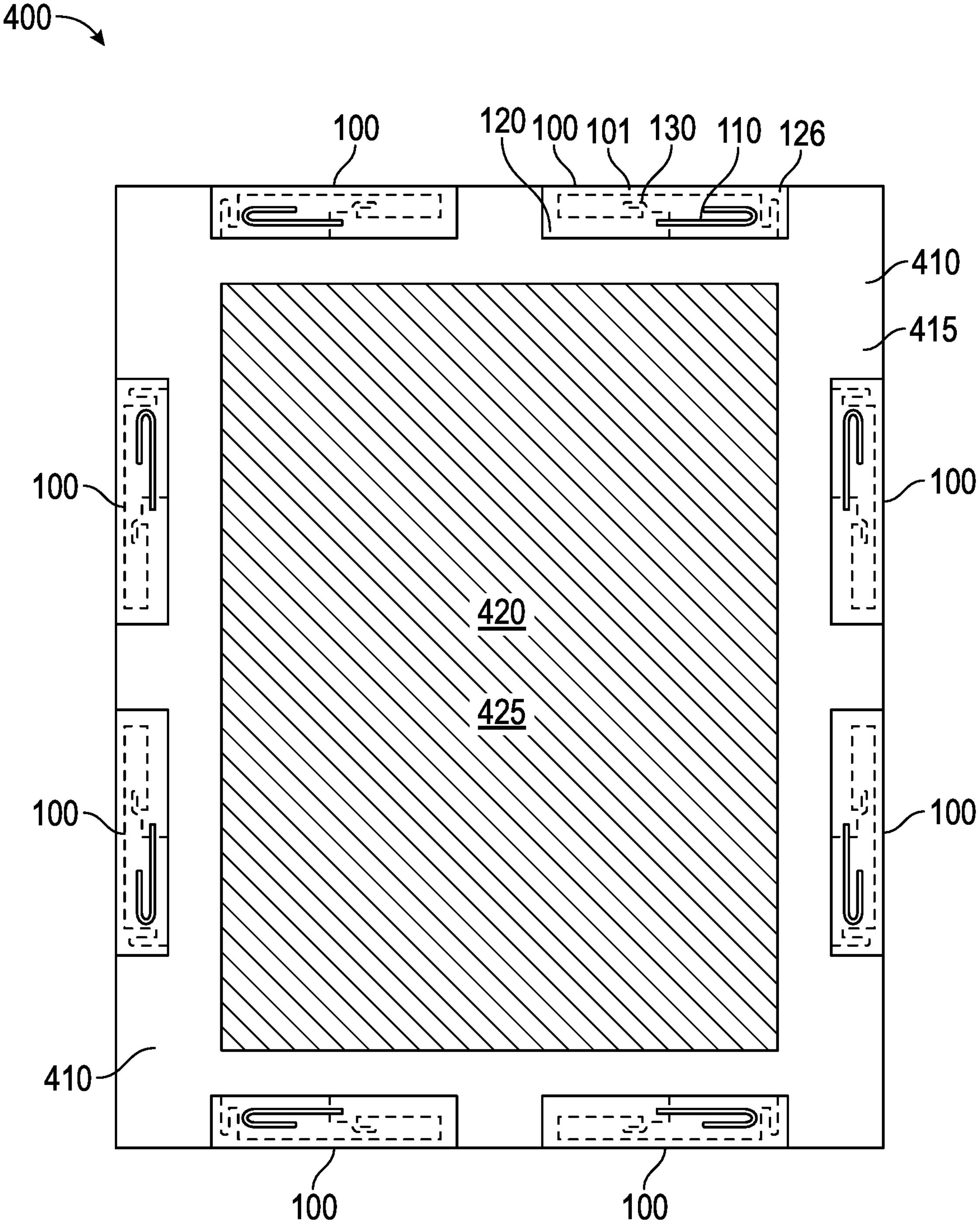
FIG. 4 shows a top view of a MIMO antenna system in accordance with a third illustrated embodiment.

FIG. 4 shows a top view of a MIMO antenna system (400) in accordance with a third illustrated embodiment. The MIMO antenna system comprises a system substrate having a center portion (420) and a perimeter (410) surrounding the center portion. The center portion comprises a ground plane (425). The perimeter comprises a clearance zone (415) disposed between the ground plane and a plurality of antennas (100) disposed on the perimeter. As shown, two antennas are disposed on each side for a total of eight antennas. The antenna comprises a substrate (101) having a first radiator (110) disposed on a top surface, and a second radiator (120) and third radiator (130) disposed on a bottom surface, the bottom surface being coupled to the perimeter. Coupled to the second radiator is a meandering portion (126). Each pair of antennas on each side are in a mirrored position with respect to each other. Antennas on opposite ends of the MIMO antenna system are also in a mirrored position with respect to each other.

Figure 5A:
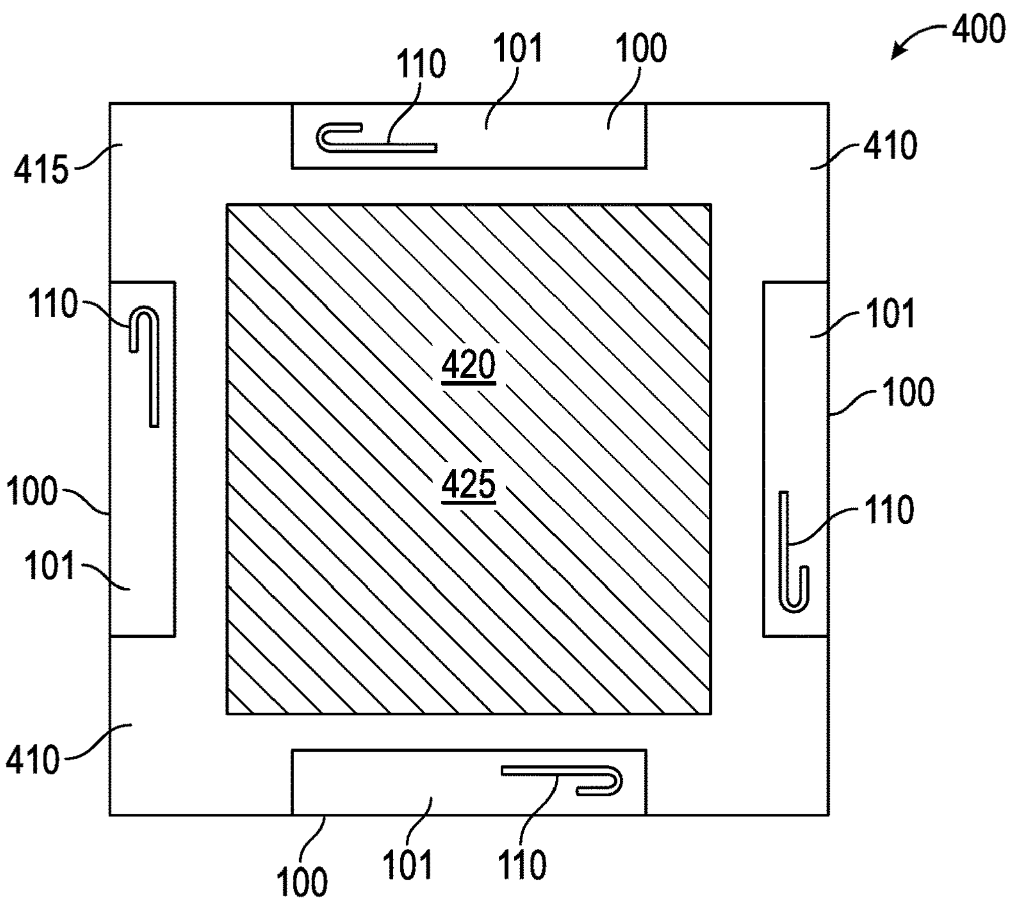
FIG. 5A shows a top view of a MIMO antenna system in accordance with a fourth illustrated embodiment.

FIG. 5A shows a top view of a MIMO antenna system (400) in accordance with a fourth illustrated embodiment. The MIMO antenna system comprises a system substrate having a center portion (420) and a perimeter (410) surrounding the center portion. The center portion comprises a ground plane (425). The perimeter comprises a clearance zone (415) disposed between the ground plane and a plurality of antennas (100) disposed on the perimeter. As shown, an antenna is disposed on each side for a total of four antennas. The antenna comprises a substrate (101) having a first radiator (110) disposed on a top surface. A second radiator (not shown) and a third radiator (not shown) are disposed on a bottom surface of each of the plurality of antennas. Antennas on opposite ends of the ground plane are in a mirror configuration with respect to each other.

Figure 5B:
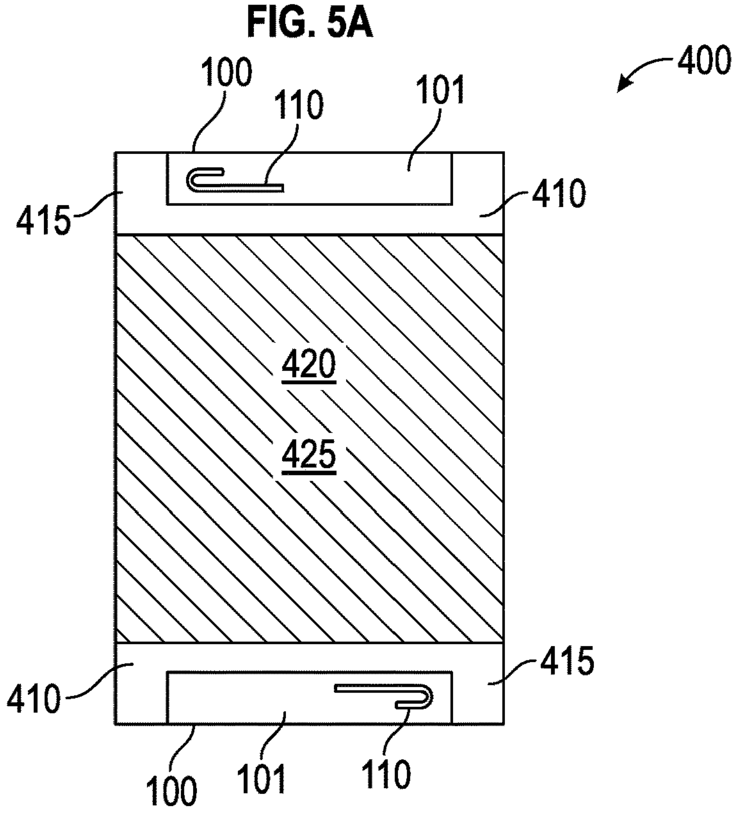
FIG. 5B shows a top view of a MIMO antenna system in accordance with a fifth illustrated embodiment.

FIG. 5B shows a top view of a MIMO antenna system (400) in accordance with a fifth illustrated embodiment. The MIMO antenna system comprises a system substrate having a center portion (420) and a perimeter (410) disposed on opposite ends of the center portion. The center portion comprises a ground plane (425). Each perimeter comprises a clearance zone (415) disposed between the ground plane and a plurality of antennas (100) disposed on the perimeter. As shown, an antenna is disposed on each perimeter. The antenna comprises a substrate (101) having a first radiator (110) disposed on a top surface. A second radiator (not shown) and a third radiator (not shown) are disposed on a bottom surface of each of the plurality of antennas. Both antennas are positioned such that the respective first radiator of each antenna is in an opposite direction from the first radiator of the other antenna.

FEATURE LIST antenna (100, 300)
substrate (101, 310)
top surface (102)
bottom surface (103, 303)
via connection (104)
positive terminal pad (105, 305)
negative terminal pad (106, 306)
mounting pads (307)
first resonator (110)
first minor portion (111)
first minor length (112)
first major portion (113)
first major length (114)
first connecting portion (115)
second resonator (120, 320)
second minor portion (121, 321)
second minor length (122, 322)
second major portion (123, 323)
second major length (124, 324)
second connecting portion (125, 325)
meandering portion (126, 326)
third resonator (130, 330)
third minor portion (131, 331)
third minor n length (132, 332)
third major portion (133, 333)
third major length (134, 334)
third connecting portion (135, 335)
MIMO antenna system (400)
perimeter (410)
clearance zone (415)

center portion (420)
ground plane (425)

What is claimed is:

1. An ultra-wide band antenna configured to operate in a frequency band, comprising:
- a substrate having a top surface and a bottom surface opposite the top surface;
- a first resonator disposed on the top surface,
  - the first resonator comprising a first major portion, a first minor portion in parallel alignment with the first major portion, and a first connecting portion coupled to each of the first major portion and the first minor portion, wherein the first resonator comprises a positive polarization;
- a second resonator disposed on the bottom surface,
  - the second resonator comprising a second major portion having a second major length, a second minor portion having a second minor length, the second minor portion being in parallel alignment with the second major portion, and a second connecting portion coupled to each of the second major portion and the second minor portion, wherein the second resonator comprises a negative polarization; and
- a third resonator disposed on the bottom surface,
  - the third resonator comprising a third major portion having a third major length, a third minor portion having a third minor length, the third minor portion being in parallel alignment with the third major portion, and a third connecting portion coupled to each of the third major portion and the third minor portion, wherein the third resonator comprises a negative polarization, and further wherein the second minor portion comprises the third major portion;
- wherein the second resonator and the third resonator are configured to operate efficiently at different ranges of the frequency band.

2. The antenna of claim 1, the second major portion further comprising a meandering portion coupled to a terminal end thereof, wherein the meandering portion comprises three parallel portions.

3. The antenna of claim 1, wherein the first resonator, second resonator, and the third resonator are each configured to operate efficiently at different ranges of the frequency band such that the first resonator is configured to operate efficiently at the mid frequencies of the frequency band, the second resonator is configured to operate efficiently at the lower frequencies of the frequency band, and the third resonator is configured to operate efficiently at the higher frequencies of the frequency band.

4. The antenna of claim 1, wherein the second resonator is larger than the first resonator.

5. The antenna of claim 1, the bottom surface further comprising a plurality of corners wherein the second connecting portion conforms to at least two of the plurality of corners.

6. The antenna of claim 1, the bottom surface further comprising a plurality of edges, wherein the second minor portion is disposed along one of the plurality of edges, and the second minor portion is disposed along one of the plurality of edges opposite the second minor portion, such that the second minor portion and the second major portion are each characterizes as being a linear structure.

7. The antenna of claim 1, wherein each section of the bottom surface disposed between the third minor portion and the second major portion is free of negatively polarized resonators.

8. The antenna of claim 1, wherein the first major portion and the first minor portion are each characterized as being a linear structure, wherein the first major portion and the first minor portion each comprise a terminal end of the first resonator such that each terminal end of the first resonator is not coupled to another positively polarized resonator.

9. The antenna of claim 1, wherein the second minor portion is characterized as being a linear structure such that one end of the second minor portion is coupled to the second connecting portion and another end of the second minor portion is not coupled to another negatively polarized resonator.

10. The antenna of claim 1, wherein the third minor portion comprises a terminal end of the third resonator such that the terminal end of the third resonator is not coupled to another negatively polarized resonator.

11. An ultra-wide band antenna configured to operate in a frequency band, comprising:
- a substrate having a top surface and a bottom surface opposite the top surface;
- a first resonator disposed on the top surface,
  - the first resonator comprising a first major portion, a first minor portion, and a first connecting portion coupled to each of the first major portion and the first minor portion, wherein the first resonator comprises a positive polarization;
- a second resonator disposed on the bottom surface,
  - the second resonator comprising a second major portion having a second major length, a second minor portion having a second minor length, and a second connecting portion coupled to each of the second major portion and the second minor portion, wherein the second resonator comprises a negative polarization; and
- a third resonator disposed on the bottom surface,
  - the third resonator comprising a third major portion having a third major length, a third minor portion having a third minor length, and a third connecting portion coupled to each of the third major portion and the third minor portion, wherein the third resonator comprises a negative polarization;
- wherein the second resonator and the third resonator are configured to operate efficiently at different ranges of the frequency band.

12. The antenna of claim 11, wherein the second minor portion comprises the third major portion.

13. The antenna of claim 11, wherein the first resonator, second resonator, and the third resonator are each configured to operate efficiently at different ranges of the frequency band such that the first resonator is configured to operate efficiently at the mid frequencies of the frequency band, the second resonator is configured to operate efficiently at the lower frequencies of the frequency band, and the third resonator is configured to operate efficiently at the higher frequencies of the frequency band.

14. The antenna of claim 11, wherein the second resonator is larger than the first resonator.

15. The antenna of claim 11, the bottom surface further comprising a plurality of corners wherein the second connecting portion conforms to at least two of the plurality of corners.

16. The antenna of claim 11, the bottom surface further comprising a plurality of edges, wherein the second minor portion is disposed along one of the plurality of edges, and the second minor portion is disposed along one of the plurality of edges opposite the second minor portion, such that the second minor portion and the second major portion are each characterizes as being a linear structure.

17. The antenna of claim 11, wherein each section of the bottom surface disposed between the third minor portion and the second major portion is free of negatively polarized resonators.

18. The antenna of claim 11, wherein the first major portion and the first minor portion are each characterized as being a linear structure, wherein the first major portion and the first minor portion each comprise a terminal end of the first resonator such that each terminal end of the first resonator is not coupled to another positively polarized resonator.

19. The antenna of claim 11, wherein the second minor portion is characterized as being a linear structure such that one end of the second minor portion is coupled to the second connecting portion and another end of the second minor portion is not coupled to another negatively polarized resonator.

20. The antenna of claim 11, wherein the third minor portion comprises a terminal end of the third resonator such that the terminal end of the third resonator is not coupled to another negatively polarized resonator.

* * * * *